United States Patent Office 3,421,040
Patented Jan. 7, 1969

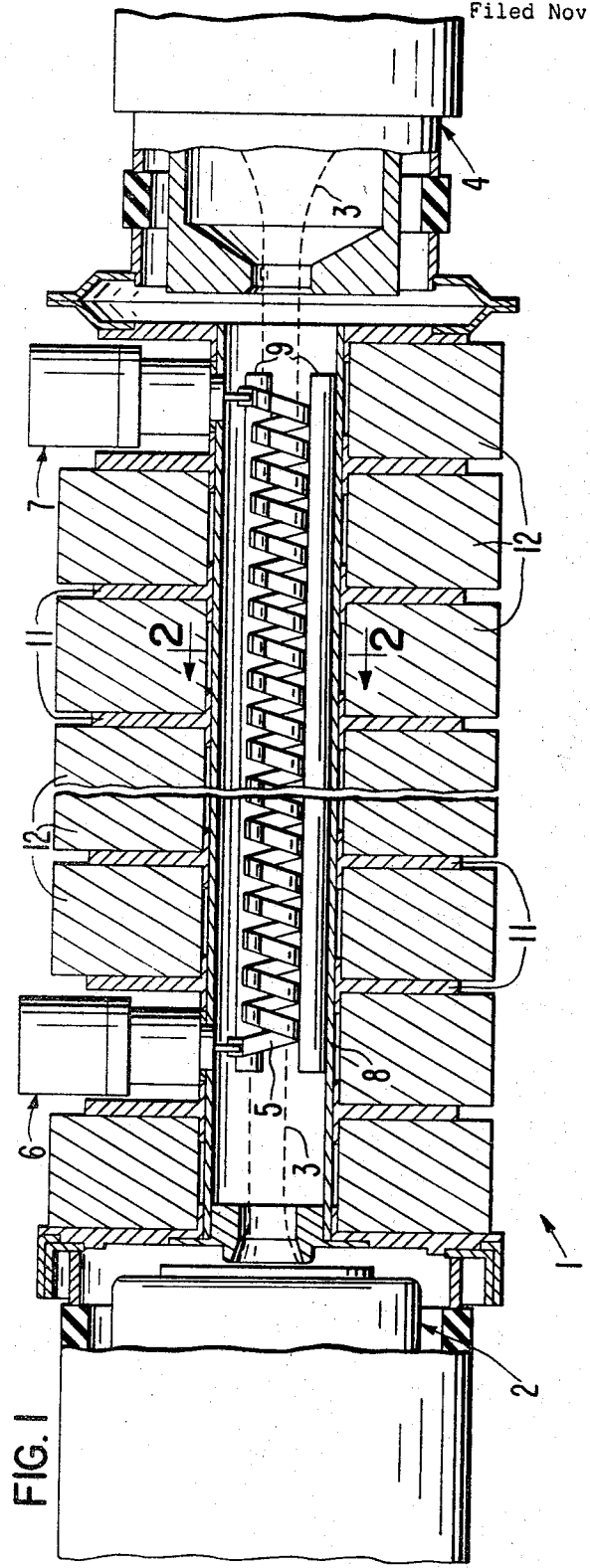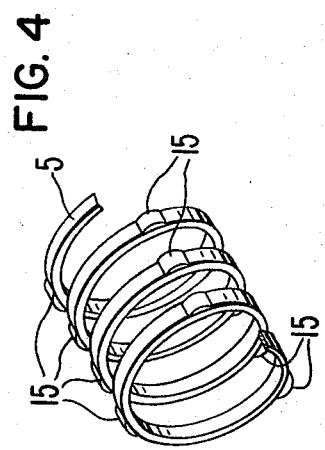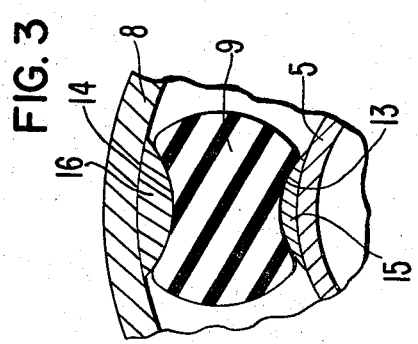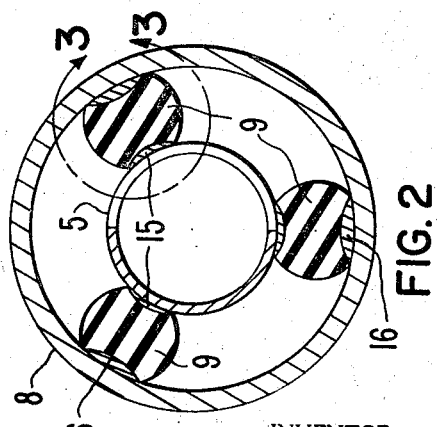
INVENTOR.
LESTER M. WINSLOW
BY Robert W Dilts
ATTORNEY

3,421,040
CIRCUIT SUPPORT FOR MICROWAVE TUBES EMPLOYING SHAPED DIELECTRIC SUPPORTS RODS TO CAPTURE A DUCTILE MATERIAL AT THE SUPPORT JOINTS
Lester M. Winslow, Mountain View, Calif., assignor to Varian Associates, Palo Alto, Calif., a corporation of California
Filed Nov. 3, 1966, Ser. No. 591,798
U.S. Cl. 315—3.5                                    10 Claims
Int. Cl. H01j 25/34

The present invention relates in general to microwave tubes employing a fragile slow wave circuit and, more particularly, to an improved circuit support structure for such tubes wherein the dielectric circuit support rods are specially shaped at their points of supporting contact to capture a ductile thermally conductive material at the support joints, whereby thermal conduction from the circuit through the support rods to the tube's envelope is enhanced to permit the tube to operate at higher power levels. Improved tubes employing the support structure of the present invention are especially useful for, but not limited in use to, high average power wideband amplifiers as used in radar jammers and wideband communication systems.

Heretofore, helix tubes have been made wherein the helix was supported within a barrel portion of the tube's envelope by means of a plurality of refractory dielectric support rods captured under pressure between the periphery of the helix and the inside surface of the supporting barrel. Typically, such supports rods are of circular cross section and make point contacts between the helix and support barrel. In such a case, the thermal conductivity through such point contacts is limited providing poor thermal conduction from the helix to the support barrel. As a result, the heat produced in the helix by beam interception is not removed at a sufficient rate, thereby causing the temperature of the helix to build up to above 1000° C. thereby limiting the power level of the tube or severely limiting its operating life.

Attempts have been made to improve the thermal conductivity of the helix support structure by shaping the contacting surfaces of the dielectric to conform to the radius of curvature of the helix and to the radius of curvature of the support barrel to increase the contacting area of the support rods through which thermal conduction may take place. However, this expedient has not been very satisfactory because the thermally produced radial expansions and contractions of the helix, in use, produce local deformations of the helix at the support points causing its radius of cruvature to change, thereby changing the contact area of the joint to a one or two point contact joint.

Other attempts to solve the conduction problems of the support structure have involved brazing the support rods to the helix. While this provides good conduction from the helix to the rods it has not always been possible to braze the rods to the surrounding barrel, and thus, conduction from the rods to the barrel remains a problem. Also the brazing operation tends to destroy the lossy coatings placed on the helix to prevent backward wave oscillations and/or regenerative oscillations, thereby introducing unwanted instabilities in the output.

In the present invention, pads of ductile material such as gold or platinum are affixed to the outer periphery of the circuit (helix) and to the inside surface of the support barrel. The dielectric support rods are then provided with diametrically opposed dished surfaces which capture the ductile pads when the rods are in position between the circuit, i.e. helix, and the support barrel. The ductile pads provide a relatively large area of thermally conductive contact between the helix, barrel and support rods in spite of thermally produced deformations of the helix and support barrel, in use. Using this technique increased thermal conduction from the helix through the support rods to the barrel is obtained and maintained without resort to brazed joints therebetween.

In a prefered embodiment of the present invention, the inwardly dished surfaces of the support rods are copper plated to mate with gold plated platinum pads on the helix and support barrel to obtain gold-to-copper diffusion joints therebetween. Such joints offer substantially improved thermal conduction therethrough and, thus, improve conduction cooling of the helix.

Tubes using the support structure of the present invention have already demonstrated a 2.5 increase in average power output and it is believed that with moderate increases in the pressure between the conductive joints of the support structure and with use of BeO rods that helix type tubes can be extended to power outputs on the order of 2 kw. average power at 4 gHz. without the helix operating temperature exceeding 1000° C.

The principal object of the present invention is the provision of improved microwave tubes.

One feature of the present invention is the provision of thermally conductive ductile pads secured to the outer periphery of the circuit and inner surface of the circuit support barrel, such pads being captured in dished surfaces formed on the dielectric support rods as sandwiched between the helix and the support barrel, whereby cooling of the circuit through its support structure is substantially improved.

Another feature of the present invention is the same as the preceding feature wherein said ductile pads are made of a material selected from the class of platinum and gold, whereby the helix circuit may be operated at elevated temperatures while providing good thermal conductivity therethrough.

Another feature of the present invention is the same as any one or more of the preceding features wherein the support rods are mode of beryllia, whereby the thermal conduction of the support structure is further enhanced.

Another feature of the present invention is the provision of a gold-to-copper diffusion joint between the ductile pads and the support rods, whereby the thermal conduction of the support joints is further increased.

Another feature of the present invention is the same as any one or more of the preceding features wherein the capturing dished surfaces on the support rods have a radius of curvature substantially less than the radius of curvature of the circuit.

Other features and advantages of the present invention will become apparent upon a perusal of the following specification taken in connection with the accompanying drawings wherein:

FIGURE 1 is a longitudinal sectional view, partly in elevation, of a microwave tube embodying features of the present invention, FIGURE 2 is an enlarged sectional view of the structure of FIGURE 1 taken along line 2—2 in the direction of the arrows, FIGURE 3 is an enlarged detail view of a portion of the structure of FIGURE 2 delineated by line 3—3, and FIGURE 4 is a perspective view of the helix structure of FIGURE 2.

Referring now to FIGURE 1 there is shown a traveling wave tube 1 employing the features of the present invention. More specifically, the tube 1 includes an electron gun assembly 2 at one end for forming and projecting a beam of electrons 3 over an elongated beam path to a beam collector electrode 4 at the other end of the tube 1. A helical microwave circuit 5, as of molybdenum or tungsten, is disposed along the beam path 3 intermediate the gun 2 and collector 4 for electromagnetic interaction with the beam 3 to produce an amplified output signal. The microwave signal, within the frequency range of 0.5 gHz. to 20 gHz., is applied to the input end of the helix 5 via an input coaxial line coupler 6. The signal travels along the helical slow wave circuit 5 cumulatively interacting with the electron beam 3 to produce the amplified output signal which is extracted from the circuit 5 at the output end via an output coaxial coupler 7 and fed to a suitable utilization device, not shown.

The helix 5 is supported from a surrounding elongated support barrel structure 8, as of stainless steel or Inconel X, via three axially directed refractory insulative rods 9, as of alumina ceramic or beryllia. The details of this support structure are more fully described below.

An array of axially spaced annular disks 11 of a magnetically permeable materials, such as soft iron, are affixed onto the barrel structure 8 and form the pole pieces of a periodic permanent magnet beam focusing stack. An array of oppositely polarized hollow cylindrical permanent magnets 12 are positioned in between adjacent pole pieces 11 to produce the periodic beam focusing magnetic field for focusing the beam through the interior of the helix 5.

Referring now to FIGURES 2–4 the helix support structure of the present invention is shown in greater detail. The support rods 9 are positioned at 120° intervals about the periphery of the helix 5. The rods 9 are provided with a pair of diametrically opposed inwardly dished surface portions 13 and 14. The innermost dished surface 13 faces and captures therewithin pads 15 of ductile thermally conductive material having a high melting point in the range of 1000° C. or higher. Two suitable materials are platinum and gold.

The pads 15 are affixed to the helix at 120° intervals about the periphery of the helix, as by brazing or spot welding a rod of the pad material along the helix. The rod of pad material is then slotted to remove the rod portions which connected adjacent turns of the helix thereby leaving the array of pads 15 affixed to the helix. In case a platinum pad is to be brazed to a molybdenum helix 5, the platinum is preferably first plated with gold and then brazed.

Similarly, the outer dished surface 14 of the rods serve to capture a pad 16 if ductile thermally conductive material such as platinum or gold, preferably gold, which is affixed as by pressure to the inner surface of the supporting barrel structure 8, as of stainless steel or Inconel X. The pads 15 and 16 can be affixed in the form of a rod of rectangular cross section and then rolled to provide a curved surface conforming to the radius of curvature of the dished surfaces 13 and 14, respectively.

In assembling the helix 5 within the supporting barrel structure 8, the barrel is pushed inwardly at three points about its circumference intermediate the positions of the support rods 9 such as to distort the barrel 8 to a generally triangular out of round condition, thereby facilitating sliding if the rods 9 into position between the pads 15 and 16. When the barrel distorting force is removed the resiliency of the barrel 8 causes it to assume its circular shape, thereby producing an inward force which puts the supporting contact joints between the helix 5, rods 9 and barrel 8 under a substantial compressive pressure. This pressure causes the ductile pad material to flow into the dished surface areas of the rods 9 to produce an excellent thermally conductive joint therebetween. The good thermal conductive properties of these joints is retained even with thermally produced distortions and relative movements of the helix 5 and barrel 8 because the ductile pads 15 and 16 are captured within the dished surfaces 13 and 14 and the ductile material of the pads will flow to retain the full contact area of the joint.

In a preferred embodiment of the present invention, copper-to-gold diffusion joints are made between the rods 9 and the pads 15 and 16, respectively, to obtain enhanced thermal conduction therethrough. Such joints are conveniently made by vacuum depositing or metallizing a coating of copper on the dished rod surfaces 13 and 14 to a thickness of about 0.0005 inch. The pads 15 and 16 are then made of gold or gold-plated and the helix 5 with its support structure is assembled. During the evacuated bake-out processing of the tube, where temperatures reach 500° C. for 8 hours, the gold, under the pressure of the joint, diffuses into the copper to form the gold-to-copper diffusion joints.

In a typical example of a helix support structure of the present invention, the helix 5 was made of molybdenum tape 0.010 inch thick and 0.050 inch wide, the helix had a center pass band of 3.5 gHz. with an inside diameter of 0.180 inch, the support barrel 8 was of stainless steel, had a thickness of 0.020 inch and a diameter of 0.380 inch, the innermost dished face 13 of the support rods 9 had a radius of curvature of 0.050 inch, and the pads 15 and 16 had thicknesses of between 0.005 inch and 0.010 inch, the inner pads 15 were made of platinum and the outer pads 16 were made of gold. This tube operated at 125 watts average output R.F. power which compares with 50 watts average power obtainable from the prior art tube using round rods 9 and no ductile pads 15 and 16. By using a thicker tape helix 5, to permit an increase in the compressive forces on the conductive joints without undue distortion of the helix 5, and by employing beryllia rods 9 it is expected that the average power output of the tube, without exceeding 1000° C. for the helix temperature, can be raised to about 2 kw.

Although the tube 1 has been described using a tape helix circuit this is not a requirement. Other types of circuits may be supported using the techniques of the present invention. For example, cross wound helices, ring and and bar circuits, slotted tube circuits and other types of topologically equivalent helix microwave circuits may be advantageously supported in this manner. Also the tubes need not be of linear or O type, but may be circular and of M type.

As used herein, the term "helical microwave circuit" is defined to include not only a simple helix but circuits employing helices, such as cross wound helices, bifilar helices, ring and bar circuits, ring circuits, slotted tubes to form helices, and topological equivalents of these circuits.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a microwave tube apparatus, means for forming and projecting a beam of electrons over a beam path, means for collecting and dissipating the energy of the beam, means forming a microwave circuit disposed along the beam path in energy exchanging relation with the beam, means forming a support structure for supporting said microwave circuit, means forming an electrically insulative structure disposed between said circuit and said support structure for supporting said circuit from said support structure, means forming a ductile thermally conductive pad abutting said circuit, and said insulative structure having an inwardly dished surface facing said ductile pad capturing said ductile pad therewithin to form a thermally conductive support joint from said circuit through said pad and insulative structure to said support structure, whereby conduction cooling of said circuit through said insulative structure to said support structure is enhanced.

2. In a microwave tube apparatus means for forming and projecting a beam of electrons over an elongated beam path, means for collecting and dissipating the energy of the beam, means forming a helical microwave circuit disposed along the beam path in energy exchanging relation with the beam, means forming an elongated barrel structure surrounding said helical circuit for supporting said circuit therefrom, means forming a plurality of elongated insulative support rods axially directed along said helical circuit and spaced around the outer periphery of said helical circuit between said circuit and said surrounding support barrel for supporting said circuit from said barrel, means forming a plurality of ductile thermally conductive pads affixed to said circuit, and said insulative support rods having inwardly dished surface portions facing said ductile pads capturing said ductile pads therewithin to form a thermally conductive support joint from said circuit through said pads and insulative rods to said support barrel, whereby conduction cooling of said circuit through said insulative rods to said support barrel is enhanced.

3. The apparatus of claim 2 wherein said ductile pads are made of a material selected from the class of platinum and gold, whereby said circuit may be operated at elevated temperatures while maintaining good thermal conductivity through said pads to said support rods.

4. The apparatus of claim 2 wherein said helix circuit is made of a material selected from the class of molybdenum and tungsten, whereby said circuit may be operated at elevated temperatures in use without loss of shape or strength.

5. The apparatus of claim 2 including, means forming a set of ductile pads affixed to the inner surface of said supporting barrel structure, and wherein said support rods include other inwardly dished surface portions facing said pads on said barrel structure and capturing said ductile pads therewithin, whereby a ductile thermally conductive support joint is formed between said support rods and said supporting barrel structure.

6. The apparatus of claim 2 wherein said dished surface portions of said support rods have a radius of curvature substantially less than the radius of curvature of the outer peripheral surface of said supported circuit at the regions of support of said circuit from said support rods.

7. The apparatus of claim 2 wherein said support rods are made of beryllia.

8. The apparatus of claim 2 wherein said supporting barrel structure is tensioned inwardly to provide pressure contact support joints between said support rods and said circuit on one side and between said support rods and said support barrel structure on the other side.

9. The apparatus of claim 2 wherein one of the two contacting surfaces between said ductile pads and said dished surfaces of said support rods is coated with copper and the other one of the contacting surfaces is coated with gold to form a gold-to-copper diffusion joint therebetween, whereby the thermal conductivity of the supporting joint defined thereby is substantially enhanced for enhanced cooling of said helix circuit.

10. The apparatus of claim 4 wherein said helical circuit is formed by a helically wound tape conductor.

References Cited

UNITED STATES PATENTS

| | | | |
|---|---|---|---|
| 2,922,067 | 1/1960 | Van Dien | 315—3.5 |
| 3,300,677 | 1/1967 | Karol et al. | 315—3.5 |

HERMAN KARL SAALBACH, *Primary Examiner.*

PAUL L. GENSLER, *Assistant Examiner.*